United States Patent Office 2,700,841
Patented Feb. 1, 1955

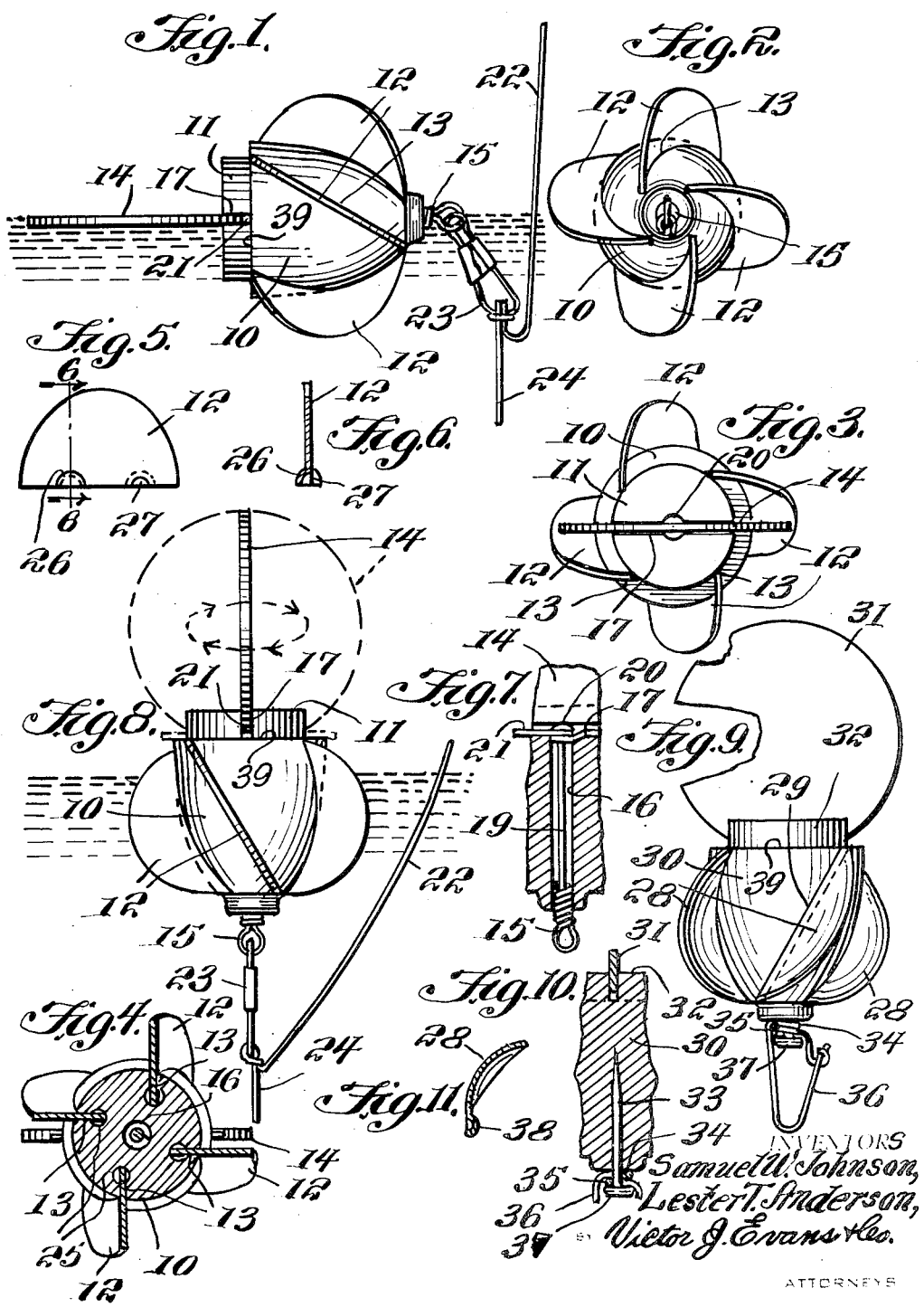

2,700,841

WHIRLING FISHING BOBBER

Samuel W. Johnson and Lester T. Anderson,
Port Allegany, Pa.

Application November 7, 1951, Serial No. 255,258

2 Claims. (Cl. 43—17)

This invention relates to fishing tackle particularly of the type used in still fishing, and in particular a cork or bobber having spirally positioned fins and a plate extended from the outer surface with the parts positioned whereby the plate rests in a horizontal position upon the surface of the water until a fish strikes the hook or bait and the pull of the fish causes the plate to move upwardly to a vertical position, and in which continued movement of the device causes the plate to spin.

The purpose of this invention is to provide an improved cork or bobber for still fishing wherein a fisherman may tell at a glance when a fish is caught on the line.

With the conventional type of cork or bobber a fish striking the line is indicated by the bobber moving downwardly into the water and when there is even a slight ripple in the water it is sometimes difficult to observe the action of the bobber or cork. With this thought in mind this invention contemplates a device that is formed to provide a direct movement whereby the action of a fish striking a line elevates a flag or target and continued action of the fish causes the flag or target to rotate so that the attention of the fisherman is positively called to the line.

The object of this invention is, therefore, to provide means for forming a bobber for fishing lines whereby the bobber moves from a horizontal to a vertical position upon a fish striking the line.

Another object of the invention is to provide a bobber having spirally positioned fins wherein the fins are arranged to cause rotation of the bobber should the bobber be drawn through the water.

A further object of the invention is to provide an improved bobber for fishing lines having a spinning plate thereon which is of a simple and economical construction.

With these and other objects and advantages in view the invention embodies a fishing bobber having a body of buoyant material with spirally positioned grooves therein, with a plate extended from one end thereof and with a pin or clevis spirally connected to the other, and said body having fins or plates mounted in the spirally positioned grooves.

Other features and advantages of the invention will appear from the following description taken in connection with the drawings, wherein:

Figure 1 is a side elevational view showing the bobber with the parts horizontally positioned.

Figure 2 is an end elevational view of the bobber looking toward the forward end thereof.

Figure 3 is a similar elevational view looking toward the opposite end thereof.

Figure 4 is a cross section taken through the intermediate part of the body of the bobber.

Figure 5 is a detail showing an elevational view of one of the fins of the bobber.

Figure 6 is a vertical section through one of the fins taken on line 6—6 of Figure 5.

Figure 7 is a detail showing a section through the body of the bobber illustrating the mounting of the swivel for attaching the lines to the bobber.

Figure 8 is a side elevational view of the improved bobber showing the device in an upright position.

Figure 9 is a similar view showing a modification wherein the body of the bobber is provided arcuate fins.

Figure 10 is a detail showing a vertical section through the bobber shown in Figure 9, showing the swivel connection of Figure 7 replaced with a pin or clevis mounted on a pin.

Figure 11 is a detail showing a section through one of the fins of the type of bobber shown in Figure 9 wherein the fins are curved or arcuate in cross section.

Referring now to the drawings wherein like reference characters denote corresponding parts the improved fishing bobber of this invention includes a buoyant body 10 of cork or other suitable material of frusto-conical shape tapering at one end, fins 12 positioned in grooves 13 in the body, a plate 14 extended from one end of the body, and a swivel 15 mounted in an opening 16 extended through the body.

A cylindrical section 11, forming one end of the body is provided with a transversely positioned slot 17 in which the plate 14 is mounted and with the plate provided with bulging crimped sections 18 it may be positively held in the groove, however it will be understood that the plate may be secured in the end of the body by other suitable means.

With the parts formed in this manner a stem 19 upon which the swivel 15 is carried is provided with a head 20 seated in the slot 17 may be secured in the body with a fastener 21, as shown in Figure 7.

With the parts formed in this manner a fishing line 22 is attached to a clevis or pin 23 in the eye of the swivel 15 and with the line attached to the clevis with a half hitch a section 24 of the line may extend for supporting hooks and the like, as shown in Figure 1.

As illustrated in Figure 4 the inner ends of the grooves 13 in which the fins 12 are positioned are provided with enlarged channels 25 and enlarged sections 26 and 27 of the fins are forced into the corresponding channels with the fins in the grooves and by this means the fins are frictionally secured in the buoyant body.

It will be understood that the fins may be straight as illustrated in Figures 1 to 8 inclusive or the fins may be curved as illustrated in Figures 9 and 11, in which the fins 28 are positioned in grooves 29 of a buoyant body 30 and the body is provided with a plate 31, similar to the plate 14, the plate being mounted in a section 32 of the body and the body having a swivel at the opposite end. The swivel is formed as illustrated in Figures 9 and 10, wherein a pin 33, driven into the end of the body extends through loops 34 and 35 of a member 36. The pin 33 is provided with a head 37, and it will be understood that a pin of any suitable type may be used in a swivel, or a clevis of a different type or design may be provided on the end of the body.

The fins 28 may also be provided with enlarged sections 38 similar to the sections 26 and 27 of the fins 12.

It will be understood that the body may be made of cork or other suitable buoyant material or the body may be made buoyant by suitable means. The numeral 39 designates a shoulder which is arranged at the juncture of the cylindrical section 11 and the adjacent portion of the body 10. The body 10 includes a frusto-conical portion tapering toward one end. The headed portion of the stem 19 of the swivel is seated in the slot 17.

It will be understood that other modifications may be made in the design and arrangement of the parts without departing from the spirit of the invention.

What is claimed is:

1. In a fishing line bobber, a buoyant body including a frusto-conical portion having one end tapered to provide a narrowed portion, a cylindrical section extending from said frusto-conical portion and arranged at the opposite end of the body from the tapered end, said cylindrical section being of smaller diameter than the adjacent frusto-conical portion of the body to define a shoulder, the outer end face of said cylindrical section being flat, said cylindrical section being provided with a slot extending from said flat face to said shoulder, a plate having a diameter greater than the diameter of said body secured in said slot, said frusto-conical portion being provided with a plurality of spaced apart grooves extending inwardly from the outer surface thereof and from said shoulder to the opposite end of said body, the inner portions of said grooves being enlarged to provide channels, a fin seated in each of said grooves and having an enlargement on the inner end thereof seated in the corresponding channel, said fins extending spirally from said body, a clevis connected to said body, a fishing line connected to said clevis and having a portion extending beyond the clevis for engagement with fish hooks.

2. In a fishing line bobber, a buoyant body including a frusto-conical portion having one end tapered to provide a narrowed portion, a cylindrical section extending from said frusto-conical portion and arranged at the opposite end of the body from the tapered end, said cylindrical section being of smaller diameter than the adjacent frusto-conical portion of the body to define a shoulder, the outer end face of said cylindrical section being flat, said cylindrical section being provided with a slot extending from said flat face to said shoulder, a plate having a diameter greater than the diameter of said body secured in said slot, said frusto-conical portion being provided with a plurality of spaced apart grooves extending inwardly from the outer surface thereof and from said shoulder to the opposite end of said body, the inner portions of said grooves being enlarged to provide channels, a fin seated in each of said grooves and having an enlargement on the inner end thereof seated in the corresponding channel, said fins extending spirally from said body, there being a bore extending into the narrowed portion of said body and communicating with the slot in said cylindrical section, a stem projecting through said bore and having a head on its inner end seated in said slot, a fastener element arranged in engagement with said head for maintaining the stem in said body, said stem having on its outer end a loop, a clevis connected to said loop, and a fishing line connected to said clevis and having a portion extending beyond the clevis for engagement with fish hooks.

References Cited in the file of this patent

UNITED STATES PATENTS

| Number | Name | Date |
|---|---|---|
| 627,344 | Maroney | June 20, 1899 |
| 1,318,650 | Dutka | Oct. 14, 1919 |
| 1,380,876 | Warden | June 7, 1921 |
| 2,077,311 | Darby | Apr. 13, 1937 |
| 2,079,509 | Kettring | May 4, 1937 |
| 2,173,540 | Rayburn | Sept. 19, 1939 |
| 2,239,813 | Dubell | Apr. 29, 1941 |
| 2,310,030 | Kruse | Feb. 2, 1943 |